United States Patent [19]

Rolston

[11] 4,305,057

[45] Dec. 8, 1981

[54] CONCAVE QUADRATIC AIRCRAFT ATTITUDE REFERENCE DISPLAY SYSTEM

[75] Inventor: David R. Rolston, Maryland Heights, Mo.

[73] Assignee: McDonnell Douglas Corporation, Long Beach, Calif.

[21] Appl. No.: 59,273

[22] Filed: Jul. 19, 1979

[51] Int. Cl.³ .................... G01C 23/00; G06F 3/153
[52] U.S. Cl. .............................. 340/27 NA; 340/705; 340/723
[58] Field of Search .......... 340/27 R, 27 AT, 27 NA, 340/721, 724, 734, 747, 750, 705, 723; 244/179–182, 194, 186; 364/424, 427, 428, 430, 433–435; 434/38, 40, 43, 44; 73/178 R, 178 T; 35/12 F, 12 N

[56] References Cited

U.S. PATENT DOCUMENTS

| | | | |
|---|---|---|---|
| 3,521,227 | 7/1970 | Congleton et al. | 340/27 NA |
| 3,605,083 | 9/1971 | Kramer | 340/27 NA |
| 3,711,826 | 1/1973 | La Russa | 340/27 NA |
| 4,040,005 | 8/1977 | Melvin | 340/27 NA |
| 4,149,148 | 4/1979 | Miller | 340/27 NA |

Primary Examiner—James J. Groody
Attorney, Agent, or Firm—Gregory A. Cone; Walter J. Jason; Donald L. Royer

[57] ABSTRACT

A Heads-Up Display system which displays an attitude reference to pilots in order to provide a reference display system as a primary flight instrument. The Heads-up Display system uses a pitch ladder system based on Euler angle data which eliminates the erratic motion or "flip-flop" of the typical pitch ladder which is inherent and unavoidable when pitching near plus or minus 90°, by utilizing a flexible graphics display which presents the pilot with a heads-up view as if he were located inside and at the center of an imaginary sphere which has heading and pitch angle information marked on its inner surface. The display of appropriately curved bars as opposed to a straight bar pitch ladder for attitude reference more realistically depicts to the pilot the aircraft situation relative to the outside world. This presentation is more easily and more reliably interpreted by the pilot and simplifies the recognition and recovery from unusual attitudes. In addition, ground track, yaw rate, turn rate information is available over the entire HUD field-of-view, thus there is no need for the pilot to redirect his attention away from his primary point of interest, the velocity vector, to obtain heading and track information. Appropriate equations are evaluated to obtain line-of-sight angles from the aircraft longitudinal axis to the desired pitch and heading points on the pitch ladder display. Such equations are solved by computer techniques for a sufficient number of intersecting points to complete the display and the graphics hardware connects the points to form the segments of the pitch ladder which represent the imaginary lines on the sphere and displays the same in the pilot's field-of-view.

28 Claims, 15 Drawing Figures

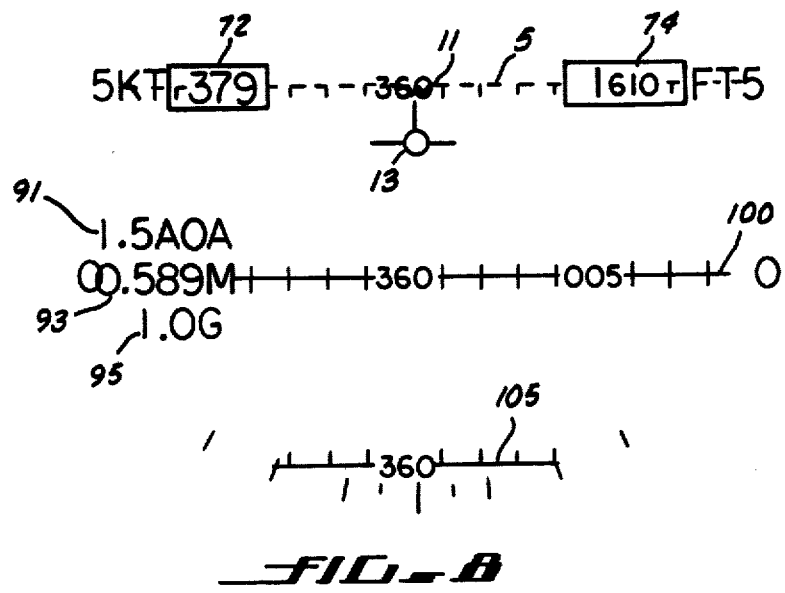
FIG_8
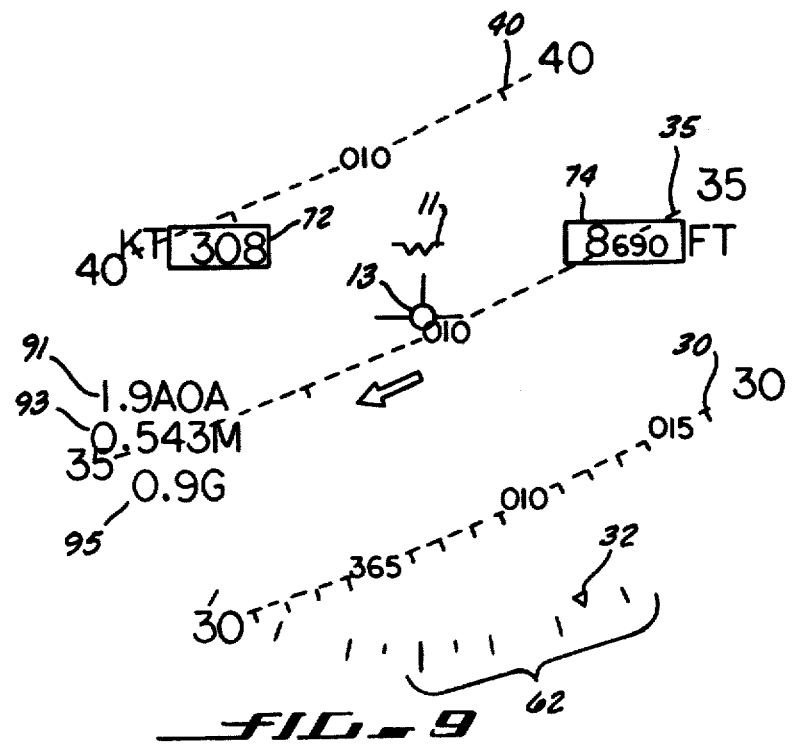
FIG_9

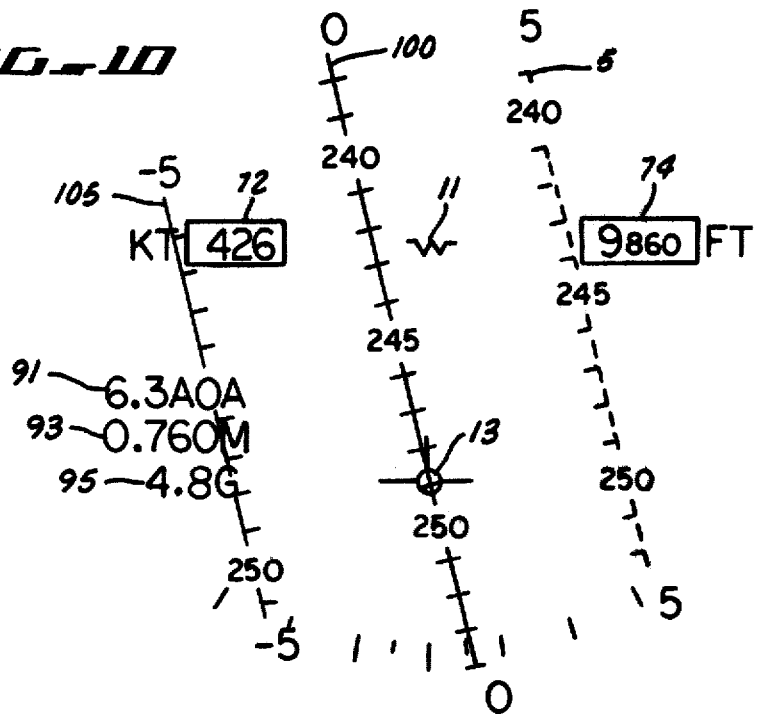
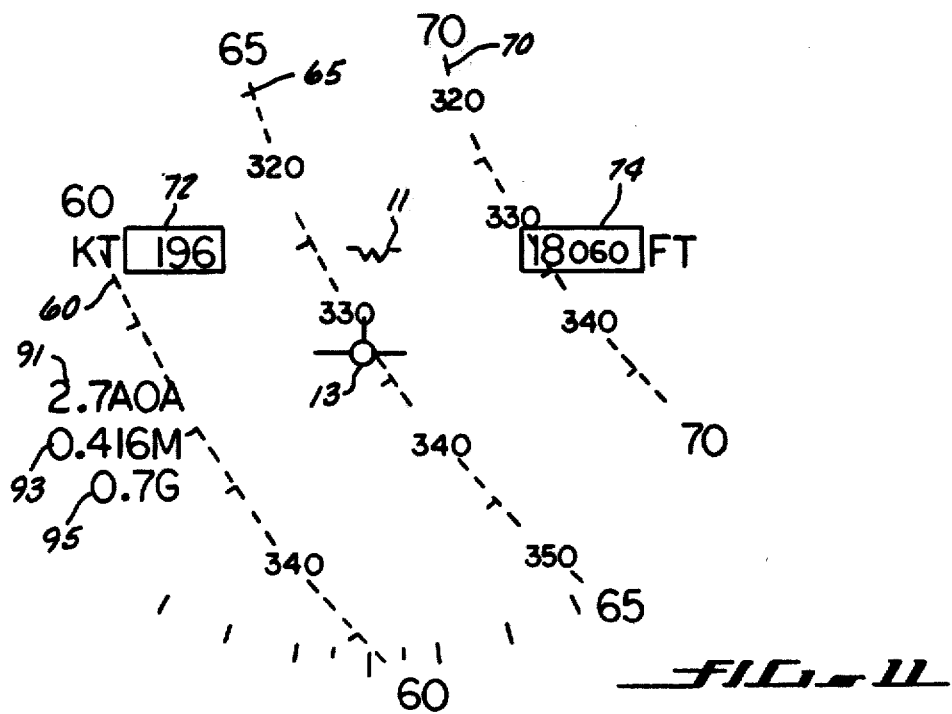

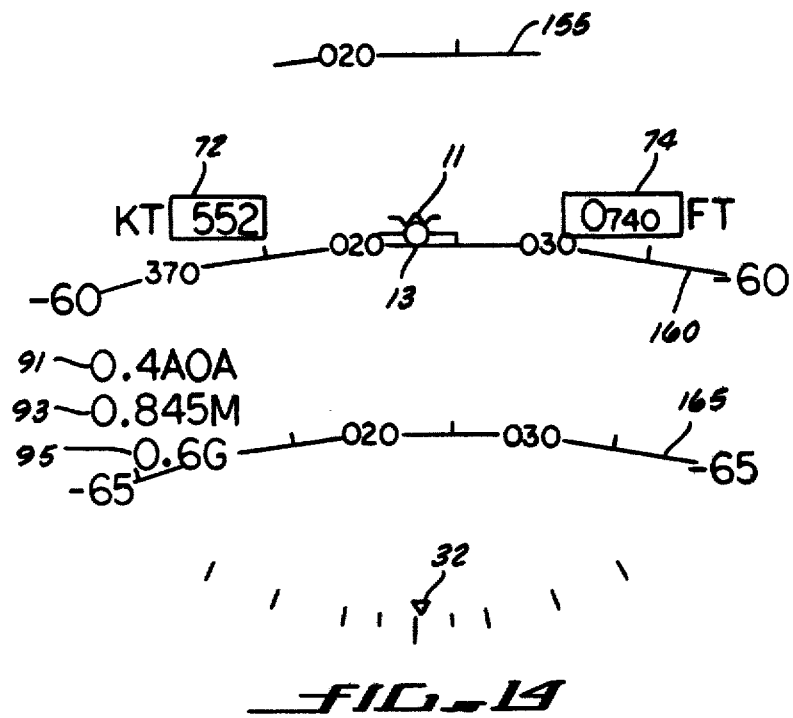
FIG_14
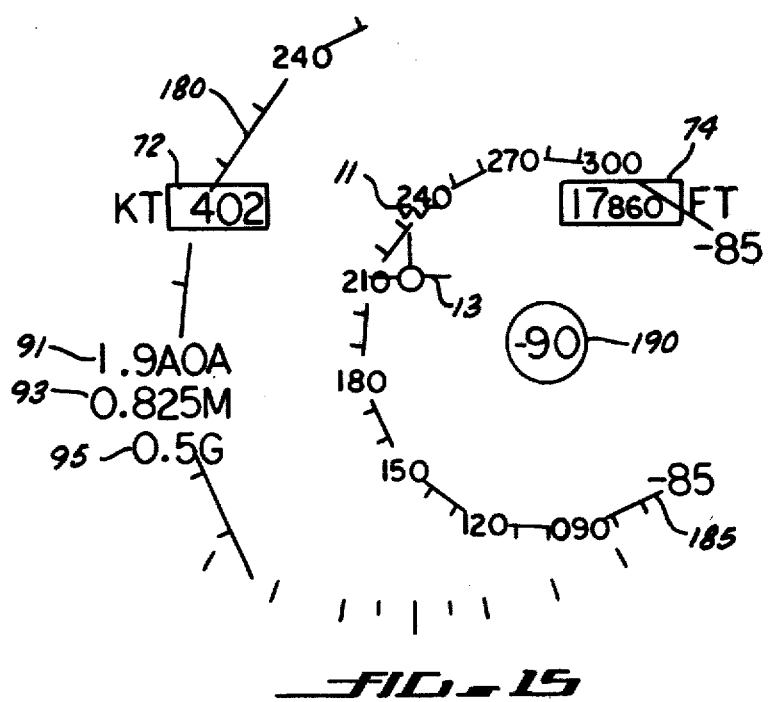
FIG_15

CONCAVE QUADRATIC AIRCRAFT ATTITUDE REFERENCE DISPLAY SYSTEM

BACKGROUND OF THE INVENTION

Prior Art is replete with many attempts at displaying an attitude reference to pilots in order to provide a reference display system as a primary flight instrument. Numerous Heads-Up Display (HUD) attitude reference devices are utilized through the use of a pitch ladder system. However, a roll axis rotation of the pitch ladder about either the pitch reference symbol or velocity vector symbol causes an apparent yawing motion. This erroneous motion referred to as the pendulum effect causes the pitch bars relative to other HUD symbology and relative to the outside world to move when viewed through the display. Therefore under the present state of the art Heads-Up Display attitude reference, erroneous pitch or flight path indications are inherent when an aircraft is in a bank or disposed at large pitch angles. Erratic motion, that is, flip-flop of the pitch ladder is inherent and unavoidable when pitching near plus or minus 90°. In addition, display of pitch attitude or flight path angle is erroneous when the actual aircraft velocity vector is out of the HUD field of view. Attempts to eliminate such problems result in distracting motion or scale changes of the pitch ladder and can cause confusion or misinterpretation by the pilot. As a result of these problems, the HUD for attitude reference has been downgraded from a primary flight instrument to secondary status and reliance is cast upon compass horizontal situation displays and two axis attitude indicators as used in the past which remain the primary references for instrument flying. The inventative apparatus herein described alleviates all of the problems above and provides a Heads-Up attitude reference display wherein there are no false yaw or sideslip indications to the pilot due to attitude reference display motion relative to other HUD symbology or relative to the outside world as viewed through the display within the limits of accuracy of the normal aircraft gyro compass system.

SUMMARY OF THE INVENTION

The attitude of an aircraft is defined by its Euler angles, these angles relate to the orientation of the body of the aircraft axis coordinate system, ie. the longitudinal axis from the nose to the tail; the lateral axis wing tip to wing tip; and the vertical axis constituting the normal to the longitudinal and lateral axes, to the earth fixed, ie. north-east-vertical, coordinate systems. Yaw is defined as the angle from north made by the projection of the aircraft longitudinal axis into the horizontal plane. Pitch is defined as the vertical angle from that projection to the aircraft longitudinal axis. Roll is the angle of rotation of the lateral axis about the longitudinal axis, referenced to wings level in the horizontal plane. Previous HUD attitude reference systems have displayed only pitch and roll information on the pitch ladder. Heading information being either absent or appearing in a separate location. The instant invention, however, integrates heading directly on the pitch ladder display. Prior integrated attitude reference displays had been utilized in the form of a mechanical three axis attitude director indicator as described above, in which case the pilot viewed the outside surface of a calibrated sphere gimballed to rotate in response to aircraft Euler angle motions. The instant invention, however, utilizes a flexible graphics display and presents the pilot with a heads-up view as if he were located inside and at the center of a sphere which has heading and pitch angle information marked on its inner surface.

In addition heading, ground track, yaw rate and turn rate information is available over the entire HUD field of view. There is no need for the pilot to redirect his attention away from his primary point of interest, ie. the velocity vector, to obtain heading and track information. The requirement for a separate heading scale or a numerical readout is eliminated altogether. Three axis attitude information is available, easy to interpret and accurate within the limits of the aircraft gyro compass system as described before. Flight path indications are exact when the velocity vector is within the HUD field of view, even when extreme pitch and bank angles are approached. The previously described erratic motion of the pitch ladder or flip-flop when pitching near plus or minus 90° is eliminated. The display of appropriately curved bar as opposed to straight bar pitch ladders for attitude reference more realisticly depicts the pilot situation relative to the outside world. This presentation is more easily and reliably interpreted by the pilot and simplifies the recognition and recovery from unusual attitudes.

The generation of the display requires the evaluation of equations which describe the locus in HUD coordinates of the lines of constant pitch and heading on the reference sphere. The sphere may be of abitrary radius because it is viewed from the center. The pitch ladder display would comprise display lines of constant pitch attitude relative to the aircraft attitude with heading marked on them. The equations evaluated locate those intersection points of pitch and heading relative to the aircraft body axis coordinate systems. From appropriate evaluation of equations it is possible to obtain line of sight angles from the aircraft longitudinal axis to the desired pitch and heading point on the pitch ladder display. Such equations may be solved by analog or digital computer techniques for sufficient number of intersecting points to complete the display and the graphics hardware connects the points to form the segments of the pitch ladder and displays the same in the pilots field of view.

BRIEF DESCRIPTION OF THE DRAWINGS

FIGS. 6 through 15 are various displays generated by the quadradic display system for indicating aircraft attitudes.

SPECIFIC EMBODIMENT OF THE INVENTION

Figure 1:
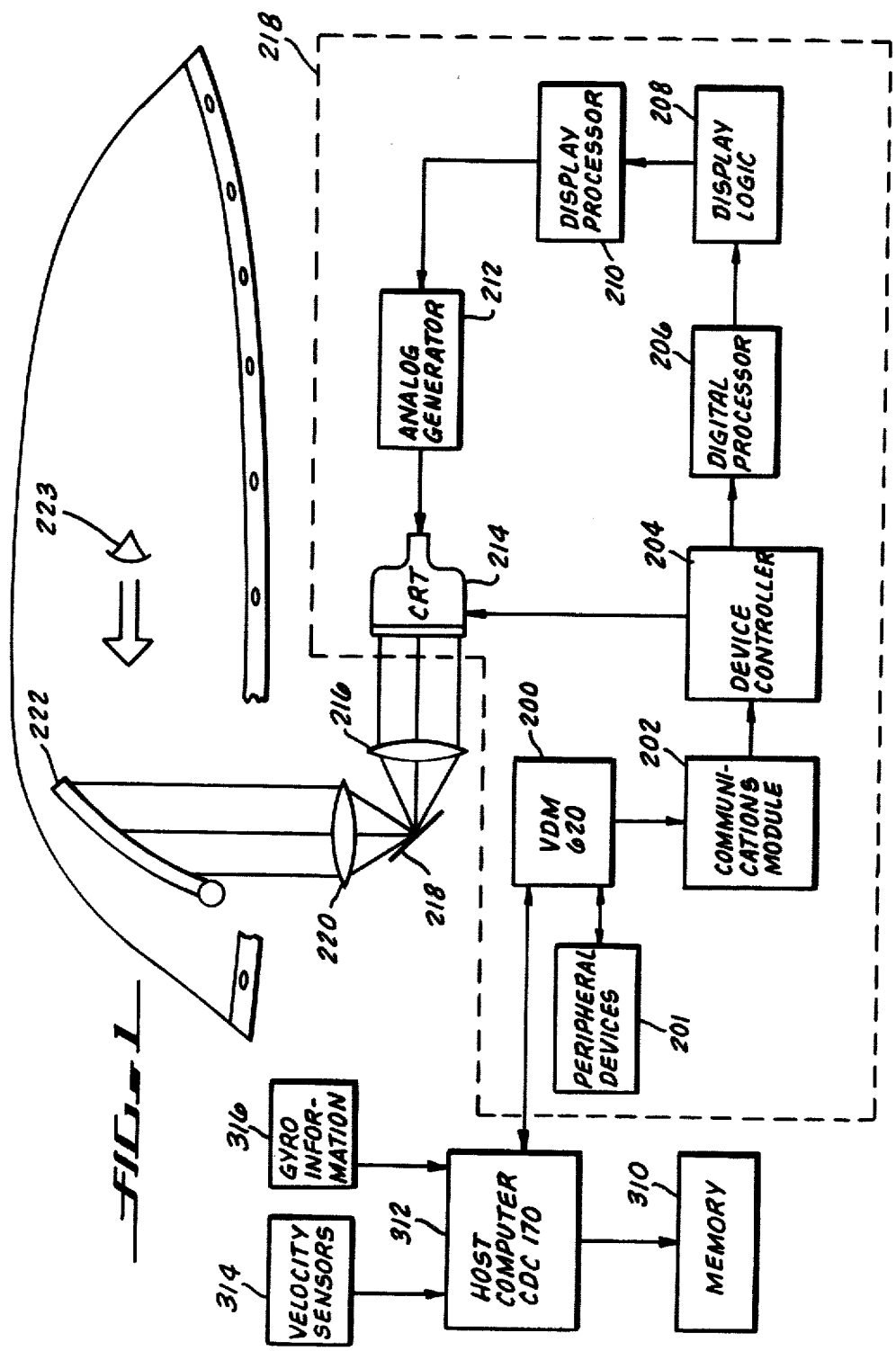
FIG. 1 is a block diagram of a quadratic display graphics system.

Integrated attitude reference displays have been utilized before in the form of the mechanical three-axis ADI (attitude director indicator) ball such as that in the F-4 and other aircraft. In that case the pilot views the outside surface of the calibrated sphere which is gimballed to to rotate in response to aircraft Euler angle motions. The system presented here takes advantage of the flexibility of graphics displays and presents the pilot with a view as if he were inside a transparent sphere which has heading and pitch angles marked on its surface. This concept is the basis for this system.

The application of this concept requires evaluation of equations which describe the locus in HUD coordinates of the lines of constant pitch and heading on the reference sphere. The sphere is of arbitrary radius because it is viewed from its center, thus all lines on the surface will appear in their proper reference attitude regardless of their distance from the center. Equations are derived which when evaluated provide indicia of the intersection points of pitch and heading relative to the aircraft body axis coordinate system as would be perceived by an operator at the center of the reference sphere. Initially, it is important to define the following arguments:

$\psi_b$ = aircraft heading angle
$\theta_b$ = aircraft pitch angle
$\phi_b$ = aircraft roll angle
$\theta_p$ = pitch angle for pitch ladder display intersection point
$\psi_p$ = heading angle for pitch ladder intersection point
$X_b$, $Y_b$, $Z_b$ = incremental displacements (logitudinal, lateral, vertical) in aircraft body axis coordinates from the $\psi_b$, $\theta_b$, $\phi_b$ reference point to the $\theta_p$, $\psi_p$ display point.

With the arbitrary radius chosen as 1.0 to simplify calculations, the following equations are derived:

$$X_b = \cos(\theta_p)\cos(\theta_b)\cos(\psi_p - \psi_p) + \sin(\theta_p)\sin(\theta_b) - 1$$

$$Y_b = \sin(\phi_b)[\cos(\theta_p)\sin(\theta_b)\cos(\psi_p - \psi_b) - \sin(\theta_p)\cos(\theta_b)] + \cos(\phi_b)\cos(\theta_p)\sin(\psi_p - \psi_b)$$

$$Z_b = \cos(\theta_b)[\cos(\theta_p)\sin(\theta_b)\cos(\psi_p - \psi_b) - \sin(\theta_p)\cos(\theta_b)] - \sin(\phi_b)\cos(\theta_p)\sin(\psi_p - \psi_b)$$

From these equations it is possible to obtain the line-of-sight angles (1. azimuth; 2. elevation) from the aircraft longitudinal axis (through the pilot's eye location) to the desired pitch and heading point on the pitch ladder display.

$$AZ_p = \arctan[\Delta Y_b/(1 + \Delta X_b)]$$

$$EL_p = \arcsin(\Delta Z_b/1)$$

In the usual case the radius of the HUD field-of-view is 10 degrees or less; thus small angle approximations apply and the equations simplify to:

$$AZ_p = \Delta Y_b \text{ (radians)}$$

$$EL_p = \Delta Z_b \text{ (radians)}$$

These equations are solved by either an analog or digital computer for enough intersection points ($\theta_p$, $\psi_p$) to complete the display and the graphics hardware connects the points to form the segments of the pitch ladder. Thus, as shown in Table 1, a computer program may be generated which can compute the above equations and determine the specific display points. Table 1 is a FORTRAN program interacting with a commercially available (IDIIOM/II) graphics display system. The graphics display system is responsive to certain mneumonics made available with the IDIIOM graphics system to generate the novel display. By utilizing these mneumonics certain subroutines were developed which may be called in FORTRAN and particular parameters input thereto. These subroutines form a part of the IDIIOM graphics system and consist of information display subroutines based on the IDIIOM display mneumonics along with a VARIAN 620 computer and display generating hardware. The IDIIOM shares memory with the 620 and executes its own program of display commands, although it is clear that any suitable graphics hardware and associated computer system may be utilized. These subroutines control the motion of the electron beam in a cathode ray tube through the graphics system. If the program containing these subroutines is executed 30 to 60 times per second the CRT image will appear without flickering. FORTRAN commands draw a picture through the use of subroutines, as indicated before. These routines prepare a data block (Buffer) from which the 620 produces display commands for the IDIIOM.

From a programming point of view the system has been made flexible so as to allow the application of the concave quadradic attitude reference concept to be applied to a host of systems which could include aircraft spacecraft, remotely piloted vehicles or simulators. Accordingly, a program as illustrated in Table 1 is developed by utilizing the various subroutines described below.

The program initializes display storage blocks (memory) allocated in the 620 for displays. There are three types of storage block which are allocated by calling the subroutine RESERVE. These are DISPLAY storage, SUBROUTINE storage, and ROTATE data storage. These are selected by setting the third parameter in the RESERVE call to 0, 1 or 2 respectively. Only one subroutine block and one rotate data storage block may be reserved. The number of display blocks required depends on how many CRT's will be used, for example, (which would require multiple CRT's if the system is used in a multiple simulator environment) and into how many pieces the display itself is to be partitioned, if multiple display portions are used. A display block may be changed without affecting any other blocks, but all items within a block that are not to change must be regenerated. Thus constant information in one block may be continuously displayed by the display hardware and changing information stored in a separate block and displayed over the constant information.

TABLE 1

```
*          *****START CONCAVE QUADRATIC DISPLAY ROUTINE*****
           CALL RESERVE (NBLK1(ICSN),LENGTH 0,NSCOPE)
     300   IXBS = IXHC
           IYBS = IYHC + HUDDPRD(JW)*DGUPD
     310   CALL USE(NBLK1(ICSN),IBUSY)
           CALL ONSCOPE(3)
           CALL ZAXIS(0,INT1,0)
*          *****GENERATE ATTITUDE REFERENCE SYMBOL ON DISPLAY*****
           CALL RESET(IXBS,IYBS)
           CALL RMOVE(-20,0)
           CALL RLINE(10,0)
           CALL RLINE(10,-10)
           CALL RLINE(10,10)
           CALL RLINE(10,-10)
           CALL RLINE(10,10)
```

TABLE 1-continued

```
          CALL RLINE(10,0)
     *****GENERATE VELOCITY VECTOR SYMBOL ON DISPLAY*****
 320  CALL RESET(IHVELX,IHVELY)
      CALL ZAXIS(0,INT2,0)
      CALL CIRCLE(15)
      CALL ZAXIS(0,INT1,0)
      CALL RMOVE(-55,0)
      CALL RLINE(40,0)
      CALL RMOVE(15,55)
      CALL RLINE(0,-40)
      CALL RMOVE(15,-15)
      CALL RLINE(40,0)
     *****INITIALIZE AIRCRAFT ROLL ANGLE DATA*****
 330  SP = SINPHI(JF)
      CP = COSPHI(JF)
     *****INITIALIZE AIRCRAFT PITCH ANGLE DATA*****
      ST = SINTHA(JF)
      CT = COSTHA(JF)
      THETAW = THA(JF)
     *****INITIALIZE AIRCRAFT HEADING ANGLES*****
      PSIW = PSI(JF)
     *****DETERMINE PITCH BARS TO BE DISPLAYED*****
      IZENITH = 0
      HFOV = 7.65
      IHR = HFOV*DGUPD
      ITICK = 16
      TEMPX = HUDDPRD(JW)*SP
      TEMPZ = HUDDRRD(JW)*CP
      TEMPY = SQRT(HFOV*HFOV - TEMPX*TEMPX)
      THETABP = THETAW + TEMPY - TEMPZ
      IF (THETABP.GT.90.) IZENITH = 1
      IF(IZENITH.EQ.1) THETABP = 180. - THETABP
      THETABN = THETAW - TEMPY - TEMPZ
      IF (THETABN.LT.-90.) IZENITH = -1
      IF (IZENITH.EQ.-1) THETABN = -180. - THETABN
      ITHEMIN = THETABN/5.
      ITHEMAX = THETABP/5.
      IF (IZENITH.EQ.1) ITHEMAX = 18
      IF (IZENITH.EQ.-1) ITHEMIN = -18
      NLAD = 1 + ITHEMAX - ITHEMIN
      DO 10 JLAD = 1,NLAD
      ITHETAP = 5*(ITHEMIN + JLAD - 1)
      CALL COSSIN (ITHETAP*DTOR,SIT,CIT)
      IF (IABS(ITHETAP).EQ.90) GO TO 20
      ISTICK = ISIGN(1,ITHETAP)
      JJPSI = 1
      KPSI = 0
      IPASS1 = 0
      IPASS2 = 0
      IPASS3 = 0
     *****DETERMINE WHICH HEADING MARKS ARE REQUIRED*****
     *****YAW ANGLE EVERY 5 DEGREES*****
      LPSI = 5
     *****YAW ANGLE EVERY 10 DEGREES*****
      IF (IABS(ITHETAP).GT.30) LPSI = 10
     *****YAW ANGLE EVERY 15 DEGREES*****
      IF (IABS(ITHETAP).GT.70) LPSI = 15
     *****YAW ANGLE EVERY 30 DEGREES*****
      IF (IABS(ITHETAP).GT.75) LPSI = 30
      JPSIW = PSIW/(LPSI - 0.01)
      JPSI = JPSIW - 1
      CALL CHARSZ(2,0)
 11   CONTINUE
      IF (KPSI.GT.12) GO TO 10
     *****SELECT POINTS*****
      KPSI = KPSI + 1
      JPSI = JPSI + JJPSI
      IF (JPSI.GT. 180/LPSI) JPSI = JPSI - 360/LPSI
      IF (JPSI.LT. -180/LPSI) JPSI = JPSI + 360/LPSI
      IPSIP = JPSI*LPSI
      IF (IPSIP.LT.1) IPSIP = 360 + IPSIP
      CALL COSSIN ((IPSIP - PSIW)*DTOR,SIP,CIP)
     *****AZMUITH AND ELEVATION EQUATIONS*****
      ALAD = CIT*ST*CIP - CT*SIT
      BLAD = CIT*SIP
      TEMPX = SP*ALAD + CP*BLAD
      TEMPY = CP*ALAD - SP*BLAD
      IF (IPASS1.NE.0) GO TO 13
     *****TRANSFORM FROM AZ AND EL TO HUD COORDINATES*****
      HSAVEX = HX1 = TEMPX*RTOD*DGUPD + 512.
      HSAVEY = HY1 = 512. + HUDDPRD(JW)*DGUPD - TEMPY*RTOD*DGUPD
      IHX1 = HX1
```

TABLE 1-continued

```
      IHY1 = HY1
      CALL HUDLMM(IHX1,IHY1,IHR,IL2)
      IF (IL2.EQ.1) GO TO 19
      IPASS1 = 1
      GO TO 11
   19 CONTINUE
*        *****THIS FIRST POINT OFF HUD F.O.V. TRY AGAIN*****
      IF (IPASS3.EQ.1) GO TO 10
      KPSI = 0
      IPASS3 = 1
      JPSI = JPSI - 1 + SIGN(1.0,PSIW)
      GO TO 11
   13 CONTINUE
*        *****FIND NEW POINT TO COMPLETE PITCH BAR*****
      HX2 = TEMPX*RTOD*DGUPD + 512.
      HY2 = 512. + HUDDPRD(JW)*DGUPD - TEMPY*RTOD*DGUPD
      XGAMMA = HX2 - HX1
      YGAMMA = HY2 - HY1
      ZGAMMA = SQRT(XGAMMA*XGAMMA + YGAMMA*YGAMMA)
      IF (ZGAMMA.LT.1.0) ZGAMMA = 1.0
      CGAMMA = XGAMMA/ZGAMMA
      SGAMMA = YGAMMA/ZGAMMA
*        *****TEST IF THIS POINT OF HUD FIELD OF VIEW*****
      CALL LIMPOS(HX1,HY1,HX2,HY2,IL)
      DHX = 36.*CGAMMA
      DHY = 36.*SGAMMA
      HX2 = HX2 + DHX*IL
      HY2 = HY2 + DHY*IL
*        *****DRAW PITCH BAR SEGMENT*****
      HX11 = HX1 + DHX
      HY11 = HY1 + DHY
      HX21 = HX2 - DHX*(1 - IL)
      HY21 = HY2 - DHY*(1 - IL)
      ATEMP = (HX21 - HX11)**2 + (HY21 - HY11)**2
      RLEN = SQRT(ATEMP)
      IF (ITHETAP.GT.0) GO TO 23
   24 CONTINUE
      IHX11 = HX11
      IHY11 = HY11
      IHX21 = HX21
      IHY21 = HY21
      CALL LINE(IHX11,IHY11,IHX21,IHY21)
      GO TO 25
   23 CONTINUE
      IF (IPTCHDM(JF).EQ.4) GO TO 24
*        *****DASHED LINE FOR POSITIVE THETA*****
      RDASH = RLEN/(ITICK*2.)
      NDASH = RDASH
      IF (NDASH.LT.1) GO TO 24
      IHX11 = HX11
      IHY11 = HY11
      RDASH = RDASH - NDASH - 0.5
      IDHX2 = ITICK*RDASH*2.
      IF (RDASH.LT.0.1) IDHX2 = 0
      CALL RESET(IHX11,IHY11)
      CALL ROTATE(SGAMMA,CGAMMA)
      CALL LOOP(NDASH)
      CALL RLINE(ITICK,0)
      CALL RMOVE(ITICK,0)
      CALL ENDLP
      CALL RLINE(IDHX2,0)
      CALL ENDROT
   25 CONTINUE
*        *****DRAW TICK MARKS*****
      IF (IPTCHDM(JF).EQ.3) GO TO 18
      IF (LPSI.EQ.5) LLPSI = 4
      IF (LPSI.EQ.10) LLPSI = 1
      IF (LPSI.EQ.15) LLPSI = 2
      IF (LPSI.EQ.30) LLPSI = 2
      ZLGAMMA = ZGAMMA/(LLPSI + 1)
      ZX = ZLGAMMA*CGAMMA
      ZY = ZLGAMMA*SGAMMA
      DHX1 = ISTICK*ITICK*SGAMMA*JJPSI
      DHY1 = ISTICK*ITICK*CGAMMA*JJPSI
      IF (IL.EQ.0) GO TO 16
      HX1T = HX1
      HY1T = HY1
      DO 14 LL = 1,LLPSI
      HX1T = HX1T + ZX
      HX1T = HX1T + ZY
      BTEMP = (HX1T - HX11)**2 + (HY1T - HY11)**2
      IF (BTEMP.GT.ATEMP) GO TO 17
```

TABLE 1-continued

```
   14 CONTINUE
      GO TO 16
   17 CONTINUE
      LLPSI = LL - 1
      IF (LLPSI.LT.1) GO TO 18
   16 CONTINUE
      IL5 = 0
      IF (ITHETAP.EQ.0) IL5 = 1
      ITEMPX = HX1 + ZX - DHX1*IL5
      ITEMPY = HY1 + ZY + DHY1*IL5
      CALL RESET(ITEMPX,ITEMPY)
      ITEMPX = DHX1*(1 + IL5)
      ITEMPY = -DHY1*(1 + IL5)
      JTEMPX = ZX - ITEMPX
      JTEMPY = ZY - ITEMPY
      CALL LOOP(LLPSI)
      CALL RLINE(ITEMPX,ITEMPY)
      CALL RMOVE(JTEMPX,JTEMPY)
      CALL ENDLP
   18 CONTINUE
*       *****DRAW HEADING*****
      IF(IPASS2.EQ.1) GO TO 12
      HX1T = HX1 - 32.
      HY1T = HY1 - 14.
      IHX1T = HX1T
      IHY1T = HY1T
      IF ((IHY1T.GT.692).0.(IHY1T.LT.614)) GO TO 21
      IF ((IHX1T.GT.117).A.(IHX1T.LT.314)) GO TO 12
      IF ((IHX1T.GT.648).A.(IHX1T.LT.870)) GO TO 12
   21 CONTINUE
      IF ((IHY1T.GT.300).A.(IHY1T.LT.480).A.(IHX1T.GT.55).A.
     . (IHX1T.LT.250).A.((IHAOAW.NE.0).O.(IHWN01.NE.0))) GO TO 12
      ITEMP = IPSIP - LPSI*JJPSI
      IF (ITEMP.LT.1) ITEMP = ITEMP + 360
      IF (ITEMP.GT.361) ITEMP = ITEMP - 360
      ITEMP = ITEMP + 1000
      CALL RESET(IHX1T,IHY1T)
      CALL RTEXT(3,INTDC(ITEMP))
   12 CONTINUE
      IPASS2 = 0
      HX1 = HX2
      HY1 = HY2
      IF (IL.EQ.1) GO TO 15
      GO TO 11
   15 CONTINUE
*       *****DRAW PITCH TEXT/LABLE PITCH BARS*****
      ITEMPX = HSAVEX
      ITEMPY = HSAVEY
      CALL HUDLMM(ITEMPX,ITEMPY,307,IL4)
      IF (IL4.EQ.1) GO TO 22
      HX1 = HX1 + DHX*IL
      HY1 = HY1 + DHY*IL
      HX1T = HX1 - 48.
      HY1T = HY1 - 18.
      IHX1T = HX1T
      IHY1T = HY1T
      CALL CHARSZ(3.0)
      CALL RESET(IHX1T,IHY1T)
      ITEMP = ITHETAP
      CALL RTEXT(3,INTDC(ITEMP))
   22 CONTINUE
      IF (JJPSI.EQ.-1) GO TO 10
      CALL CHARSZ(2,0)
      HX1 = HSAVEX
      HY1 = HSAVEY
      JPSI = JPSIW - IL2
      IPASS2 = 1
      JJPSI = -1
      GO TO 11
   20 CONTINUE
*       *****DRAW ZENITH CIRCLE*****
      TEMPX = -CT*SP*SIT
      TEMPY = -CT*CP*SIT
      HX1 = TEMPX*RTOD*DGUPD + 512.
      HY1 = 512. + HUDDPRD(JW)*DGUPD - TEMPY*RTOD*DGUPD
      IHX1 = HX1
      IHY1 = HY1
      CALL RESET(IHX1,IHY1)
      CALL CIRCLE (51)
      CALL CHARSZ(3,0)
      HX1T = HX1 - 42.
      HY1T = HY1 - 18.
```

TABLE 1-continued

```
     IHX1T = HX1T
     IHY1T = HY1T
     ITEMP = ITHETAP
     CALL RESET (IHX1T,IHY1T)
     CALL RTEXT (3,INTDC(ITEMP))
     IF(ISIGN(1,ITHETAP).EQ.-1) GO TO 10
     CALL RESET(IHX1T,IHY1T)
     CALL TEXT(1,1L+)
  10 CONTINUE
 399 SEND
*        *****FINISH OF CONCAVE QUADRADIC ON HUD*****
```

The FORTRAN statement for calling RESERVE is:
CALL RESERVE (NBLK,LENGTH,ITYP,NSCOPE)

NBLK is the block number, less than 21. LENGTH is the block length, and NSCOPE is the scope number to which the block is assigned. NSCOPE is immaterial if ITYP is is not zero (a regular display data block). As many calls as needed be made to RESERVE at any time. Blocks are numbered by the user with NBLK. These numbers have to be used when selecting blocks to update, e.g. CALL USE(NBLK,0).

The instant display system has been designed so that it is not necessary to store a fixed rotatable figure or subroutine. In-line rotation is accomplished by calling ROTATE(SIN(A),COS(A)). Calls to RLINE and RMOVE following ROTATE are transformed by the 620 before being drawn. Calls to TEXT, or ENDROT stop the rotation action. Calls to RESET, LINE, or CLINE are unaffected and succeeding RLINE, RMOVE calls are again rotated.

DRAWING DISPLAYS

Before a display is generated on the CRT an ordinary display block is selected by calling USE(N,IADDR), where N is the block number and IADDR is zero or an assigned variable with a statement to go to if the system is busy. At the beginning of each display block the system presets certain default conditions such as solid lines, medium brightness, and size 2 characters. (These are not preset in subroutines however.) The subroutines ZAXIS and CHARSZ change these selections, which will then apply until changed again or the next block is displayed. After selecting a block with USE, the subroutines described hereafter are used to prepare the display to be sent to the 620.

The IDIIOM coordinate system has the origin in the lower left corner of the screen. X and Y values in the first quadrant to 1023 pixtels are normally displayed. Arithmetic overflow does not occur at this value however, and displays do not wrap around until values beyond ±2047 are reached.

The routines, LINE, and RESET are absolute coordinate routines. After a display is completed it is sent to the 620 by the call to SEND. Another display generated in the same block replaces the data currently displayed and thus allows the display to be updated.

DECIMAL NUMBER DISPLAY

For convenience in displaying numbers on the screen the function INTDC, integer to display code, is defined.

The value of the INTDC function is a display code word (10 characters), with a right justified, blank filled, decimal character, signed integer representation of the value of the integer parameter passed to the function as INTDC(ITEMP).

The result of this function is used in a call to TEXT or RTEXT for display. RTEXT takes 10 or fewer right justified characters from a word and displays them, TEXT uses any number of left justified characters.
RESERVE(NBLK,LENGTH,ITYP,NSCOPE)

Reserve causes the 620 to allocate a display storage block. NBLK is the block number, LENGTH the length, ITYP is a type of block indicator and NSCOPE is the scope on which this block will display if ITYP is zero.

| ITYP | = | 0 | Normal display block. |
|---|---|---|---|
| ITYP | = | 1 | Subroutine block (Only one in each system) |
| ITYP | = | 2 | Rotate data block (Only one in each system) |

USE (NBLK1(ICSN),IBUSY)

Generated data will be output. The NBLK1(ICSN) is the number of the display block in use. The following graphics calls produce data in block NBLK1(ICSN). IBUSY is an assigned statement number to which control is transferred if all buffers are full. If IBUSY is zero the normal case, USE loops until a buffer is available.
SEND This routine causes data to be sent to the 620. It is called internally by USE, if data is present.

The Euler angles are provided by signals from an attitude gyro set; velocity vector location comes from signals generated by angle-of-attack and sideship sensors or from an internal navigation set. These signals are generated by subroutines simulating these sensors in the simulator. The source of aircraft signals for Euler angles and velocity vector angles are clearly illustrated on FIG. 1.

DATA GENERATION PROGRAMS

The following routines are fast data packing programs which prepare coordinates, data and or codes for transmission to the 620.
RESET(IX,IY)

Positions the beam at (IX,IY) without drawing a line. 2 display words
LINE(IX1,IY1,IX2,IY2)

Combines the above two operations and draws an entire line from (IX1,IY1) to (IX2,IY2). 4 display words
RLINE(IDELX,IDELY)

Draws a relative line a distance (IDELX,IDELY) from the present beam position.
RMOVE(IDELX,IDELY)

Moves the beam unintensified, relative to its present position (IDELX,IDELY). 2 display words
TEXT(N,MESS)

Display N display code characters from a left justified character string in MESS. MESS may be a Holerith field. (N+1)/2 display words

CIRCLE(IRAD)

Draws a circle of radius IRAD with center at the present beam position. Beam returns to center. IRAD 512. 1 display word

ZAXIS(MODUL,INTEN,BLNK)

The IDIIOM hardware can draw lines in solid form or dotted, dashed, or dot-dashed, with 4 different intensities. Following items are drawn according to these parameters:

| MODUL = | 0 | Solid (Default condition) |
|---|---|---|
| | 1 | Dotted |
| | 2 | Dashed |
| | 3 | Dot-dashed |
| INTEN = | 0 | Dim |
| | 1 | Medium |
| | 2 | Bright (Default condition) |
| | 3 | Very Bright |

If BLNK is non-zero following items will blink. 1 display word

CHARSZ(N,IHV)

Selects a new character size N, $0 \leq N \leq 3$. IHV=0 for normal characters, 1 for vertical lettering. 0 or 1 display word

ONSCOPE(N)

ONSCOPE turns on scope N, ($1 \leq N \leq 12$), for the remainder of a block.

ROTATE(SIN(A),COS(A))

ROTATE causes RLINE and RMOVE calls which follow to be rotated about the present beam position by the angle A when called with the sine and cosine as the two parameters. RESET calls may be intermixed to position to an absolute coordinate. A call to TEXT, SUB, CLINE or ENDROT stops the effect. 1 display word

ENDROT

Stops coordinate rotation initiated by ROTATE. 0 display words

RTEXT(N,MESSG)

RTEXT displays the rightmost N display code characters, $1 \leq N \leq 10$, from a single word, MESSG. MESSG is often the INTDC function. (N+1)/2 display words

Having thus described the concept upon which the invention is based and the computer program subroutines and their functions, it is noted in FIG. 1 that the velocity sensors in 314 and the gyro device 316 are coupled to a host computer 312 (CDC 170). Said computer having an associated memory 310. The host computer 312 communicates with an intermediate computer 200 (VDM 620) which has associated perpherial devices 201 and a communications module 202 which is coupled to a device controller 204. The device control is coupled directly to a CRT 214 or through a digital processor 206 to display logic 208, a display processor 210 to an analog generator 212 which is also coupled to the CRT 214. The portion enclosed by the dotted line labeled reference numeral 218 comprises the IDIIOM-/II system used in the instant invention. The CRT 214 display is coupled through a pair of lenses 216 and 220 and reflector 218 to a heads-up display 222 where the display is presented before the pilots eye or line of sight 223. A computer program resident in the host computer utilizes subroutine resident in the secondary computer 200 and essentially comprises the function shown in FIGS. 2 through 5 which are more particularly described and shown in Table 1 above.

Figure 2:
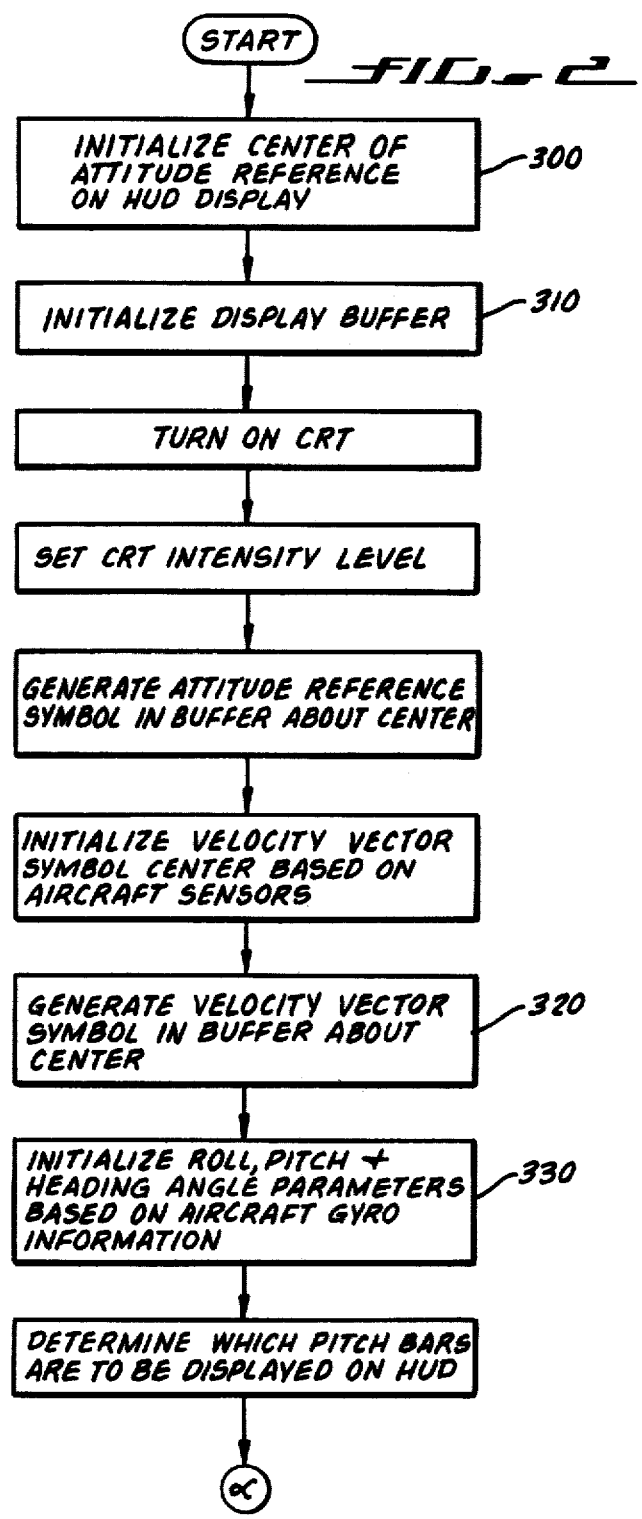
FIGS. 2 through 5 are the flow diagrams of the computer program which generates the quadratic display.
Figure 3:
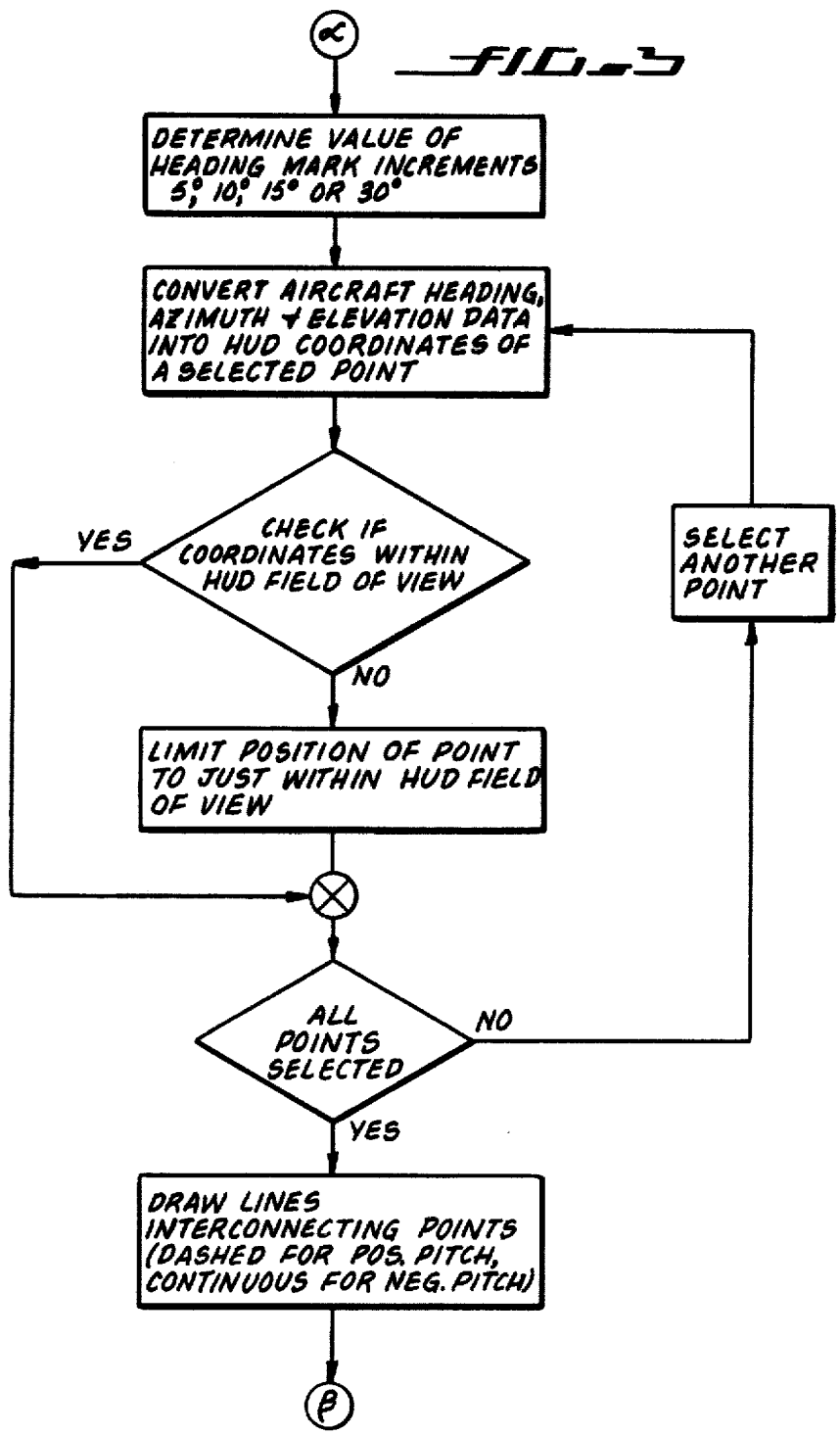
Figure 4:
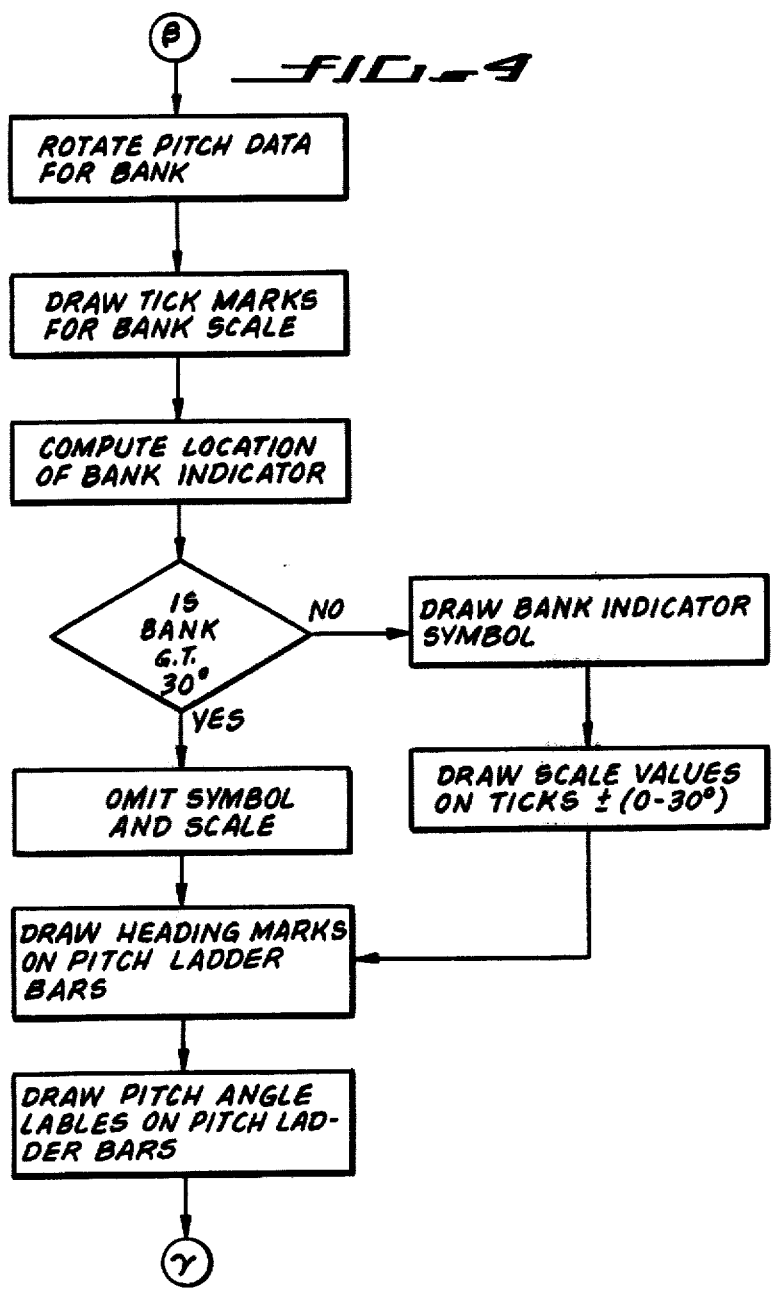
Figure 5:
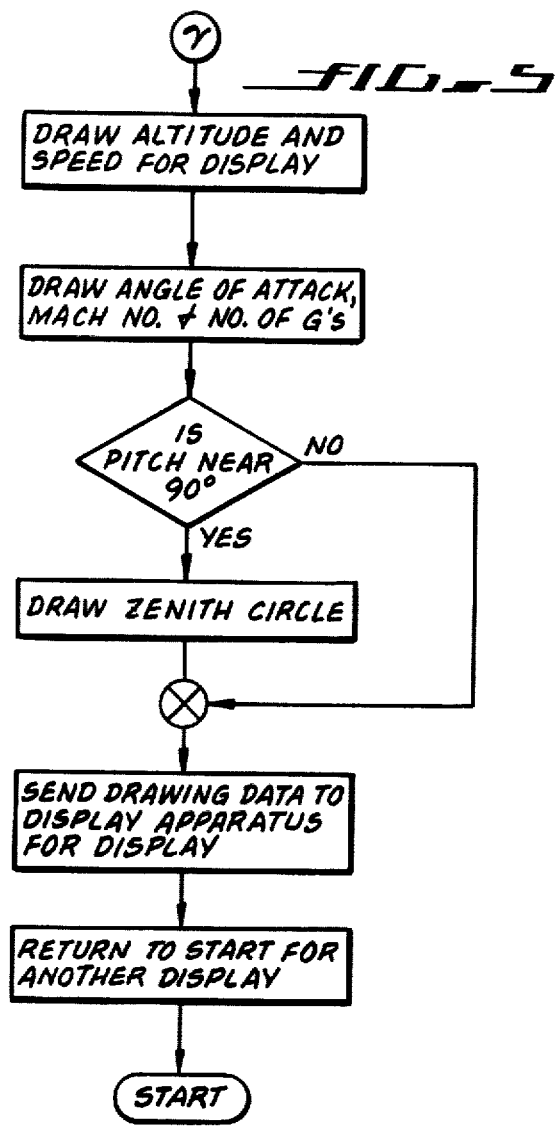

With reference to FIG. 2 the start of the concave quadradic display routine initializes the center of the attitude reference on the HUD display label 300 in the computer program. The display buffer is initialized, label 310 in the computer program, and the CRT is turned on and the CRT intensity level is set. The computer then generates the attitude reference symbol on the display about the initialized center by appropriate movement of the CRT beam and line generation as indicated in Table 1. The velocity vector information is initialized by the computer and the computer generates the velocity vector symbol about the center of the initialized value labeled 320 in the computer program. Roll angle data, pitch angle data and heading angles are initialized beginning at label 330 in the computer program. The program then determines which pitch bars are to be displayed on the HUD by determining the pitch angle and adjacent pitch bars depending upon the particular heading. The value of the heading mark increment is then set at 5, 10, 15 or 30 degrees. The program then computes the HUD coordinates of selected points by evaluating the previously derived equations, computes the various intersection points for heading and pitch as they would appear on the reference sphere and then converts these intersection points into HUD coordinates to be displayed on the heads-up display. When a point is computed the computer checks to determine whether or not the point is within the HUD field of view. If it is not, the XY coordinates of the computed point or reduced until it is within the HUD field of view. The program then selects another intersection point and converts heading azmuth elevation data into HUD coordinate points. When all the points are selected and converted into HUD coordinates for display the computer draws lines interconnecting such points. These lines being dashed for the positive pitch bars and continuous for negative pitch bars (ZAXIS routine). If the attitude sensors of the system indicate that the aircraft is in a bank attitude the computer rotates the pitch data in memory by the appropriate roll angle through the use of the ROTATE subroutine. As noted between labels 23 and 25 of the computer program, the computer then draws tick marks for the bank scale in memory and computes the location of the bank indicator if the bank is greater than 30 degrees no bank indicator or scale values are drawn on the bank angle scale. If the bank is less than 30 degrees both the bank indicator symbol and scale values for the tick marks from 0 to 30 degrees are drawn along with the tick marks. The computer then draws heading marks on the pitch ladder bars and draws the pitch angle labels on the pitch ladder bars. Altitude and speed information as well as the angle of attack, mach number and the number of G's are drawn in the appropriate blocks for display. The computer then tests to determine if the pitch is near 90 degrees, that is, if the zenith circle is within a given radius of the HUD field of view. If so, a zenith circle about the 90 degree point is drawn at a specified radius. If not the circle is omitted. All of the information is then sent by the host computer on the send command through the intermediate computer to the display apparatus for displaying the same through the graphic system. The computer then returns to the start of the graphics display to accept new data and generate another display. The various kinds of displays which may be generated are illustrated in FIGS. 6 through 15.

Figure 6:
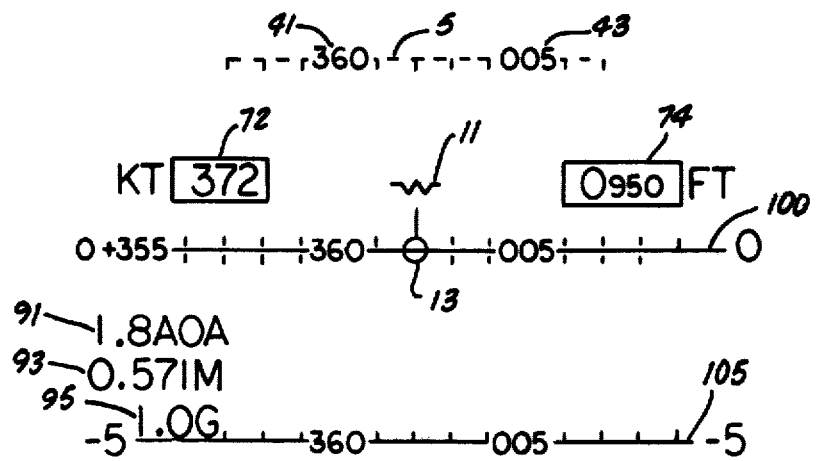

Thus, in FIG. 6 we see a typical illustration of the Heads-Up Display during level flight. With specific reference to FIG. 6, we note heading labels 41 and 43 which appear on the pitch bars. Pitch bars 5, 100 and 105, in this particular instance represent pitch ladder bars for 5 degree pitch, shown by pitch ladder 5, 0 degrees pitch shown by pitch ladder 100, and pitch ladder 105 represents a minus 5 degrees pitch. A water line mark, that is, the attitude reference symbol 11 remains stationary on the Heads-Up Display, as the primary point of reference to indicate the aircrafts position with regard to the other display parameters. The flight path marker, that is, the velocity vector is represented by the symbol similar to the longitudinal view of an aircraft structure, reference number 13. The difference between the position and the velocity vector 13 and the attitude reference symbol 11 is an indication of the difference between aircraft attitude and direction of speed. In this instance, we note that the aircraft is slightly pitched upwards and traveling along a path that is very nearly at zero pitch, i.e., level flight. At the bottom of FIG. 1, is a bank angle pointer 32. Bank angle is used for reference when there is a slight deviation in bank, or when the pilot wishes to perform or reference his position precisely with regard to slight bank angles to critically determine his attitude. The bank angle reference scale is normally not required byeond bank angles of 30 degrees or more. Also shown on display is an airspeed parameter 72 which displays the airspeed to the pilot in knots. Adjacent thereto but spaced apart therefrom disposed symmetrically on the display is an altitude parameter 74 which gives the pilots altitude in feet. Displayed below the airspeed parameter are angle of attack parameters, the mach number, and the G load factor identified by reference numbers 91, 93 and 95 respectively. It may be noted from FIG. 1 in the very near level flight position the pilots heading is approximately two degrees. Should the pilots heading change, the heading labels will translate along the pitch ladder rung depending upon the direction of change, always giving the pilots true heading relative to the water mark.

Figure 7:
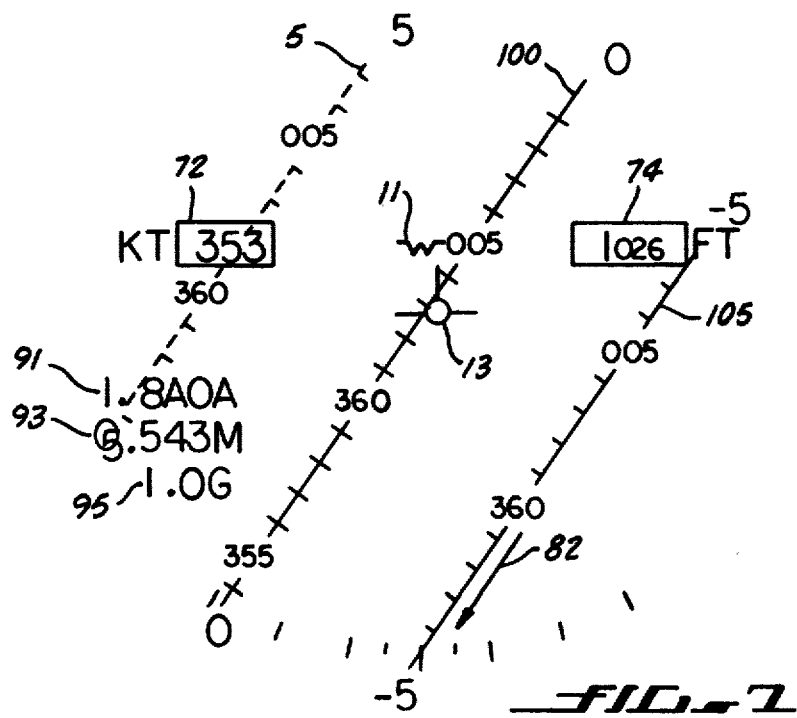

FIG. 7 is an indication of what the pilot would observe in level flight, i.e., no pitch, but in an approximately 50 degree banking right turn. It is noted that the pilot reference information, i.e., display parameters, identified by reference numerals 72, 74, and 93 through 95 remain stationary and do not significantly interfere with the display. It should be noted that in this attitude, i.e., high banking angle, that the bank angle pointer and the bank angle scale are absent. This is due to the fact that the bank angle pointer and scale are normally utilized by the pilot only when making relatively small bank angle measurements as noted before. The pilot can estimate the bank angle from the angle of the display relative to the water mark for larger bank angles, although the tick marks remain to alert the pilot as to the position of the bank angle scale when different attitudes are assumed. Since in FIG. 7, the pilot is in a right turn, the heading information will continually translate in the direction of the arrow 82. Thus, as may be noted from the difference between FIG. 6 and FIG. 7, the water mark has shifted from the two degree point to approximately the four degree point and will continue to increase as the turn is continued. In the particular instant of time represented by FIG. 7 pitch bars 5, 100 and 105 remain disposed relatively the same with respect to one another giving the pilot an indication of his pitch position relative to other pitch bars. Note in particular that the positive pitch bar is a dashed line on the display, while the zero and negative pitch bars are solid lines giving the pilot another indication of his relative attitude with respect to the imaginary sphere upon which the quadradic reference display principle is based.

FIG. 8 is a representation of the display a pilot would see in an approximate 5 degree pitch with wings level. Note in particular that the heading information is deleted where it would interfere with the parameter displays 72, 74, 91, 92 and 95. This is accomplished through the computer program used to generate the graphics data which selectively obliterates certain data thus allowing the pilot to continually observe more significant data on the display. Here we note that the water mark is on the 5 degree pitch bar 5, with the velocity vector slightly below that. Since the velocity vector is well above the zero degree pitch bar the aircraft is climbing slightly.

FIG. 9 is a representation of the quadradic display when the aircraft is in a climbing right turn. As noted the water mark is above the 35° pitch bar with the velocity vector slightly below and to the right of that as the pilot proceeds through the turn the heading labels will translate in the direction of the arrow. Thus, giving the pilot an indicating of his heading any time.

FIG. 10 is an illustration of the display generated when the pilot enters a hard left turn at very nearly level flight. Here the aircraft attitude is slightly above the 0° pitch while the velocity vector at 0° although the roll angle between the aircraft attitude and level flight is extremely high. The display is easily interpreted by the pilot to indicated what his approximate attitude is with regard to the reference sphere.

FIG. 11 is an indication of the quadradic display when the aircraft is in a 65° climb while making a left turn. Note that the water mark is slightly above 65°, the velocity vector is very nearly at 65° and since we are in a climbing attitude the pitch bars are all dashed lines. It may be noted from the display that at high pitch angles the pitch bars are no longer straight lines as in prior art systems. In fact, only the 0° pitch bar would be a straight line, that is, one which has a radius of curvature that is infinite while all other pitch bars has a radius of curvature less than infinity.

Figure 12:
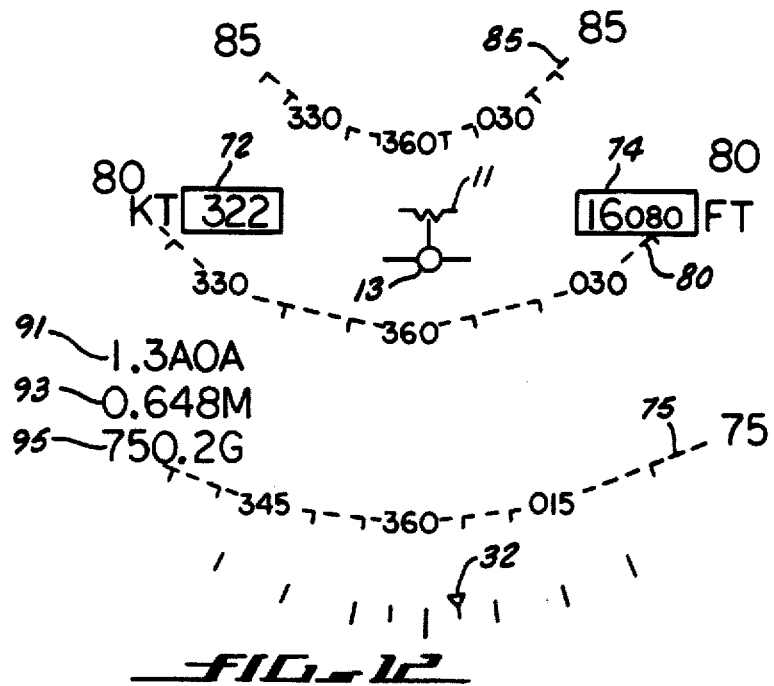

In FIG. 12 we note the aircraft is in a steep climb with the wings very nearly level as noted by the bank angle marker 32 and is pitching between 80° and 85°.

Figure 13:
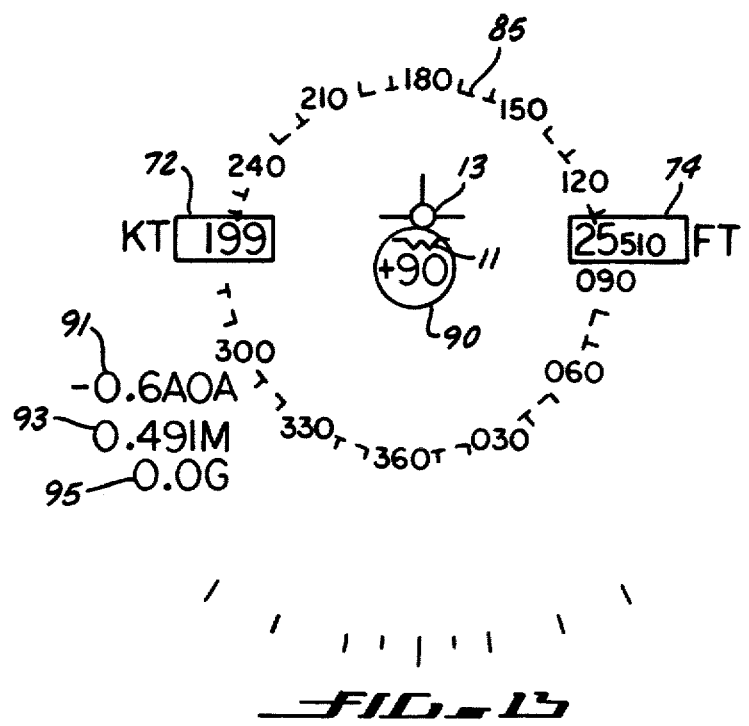

In FIG. 13 the aircraft is in a very nearly vertical climb and is pitching near plus 90°. The zenith circle 90 is shown generated about the 90° pitch point, the 85° pitch bar in this display forms a complete circle of dashed lines because we are at positive pitch. The airspeed and altitude indicators remain clearly disposed for view due to the blanking feature of the display system. This display is impossible with other prior art systems because the Euler angles for roll $\phi$, and heading ($\psi$) are undefined at pitch = ±90°. However, with regard to the reference sphere in the quadradic display system the pilot still is able to determine his particular heading and attitude from the display generated with reference to an imaginary sphere.

In FIG. 14 we see the display generated on the HUD when the aircraft is in a 60° dive with the wings essentially level as noted by the bank reference indicator 32. Here the aircraft heading 11 and the velocity vector 13 are very nearly superimposed on one another and pitching near the −60° pitch bar reference numeral 160. For convenience all of the pitch bars shown in the drawings possess the reference numeral representing the particular pitch degrees represented. Negative pitch is distinguished from positive pitch by a reference numeral of 100 plus the absolute value of the negative degree pitch, while positive degree pitch bars are labeled with reference numerals identical to the positive pitch.

Finally in FIG. 15 the representation the display representing an 85° dive with a right bank is illustrated. Since at high pitch angles heading is undefined we will see that the heading marks will rotate on a right bank in the direction of the arrow and essentially indicates the roll of the aircraft. The solid line pitch bars indicate that the pilot is in a dive and the negative 90 zenith circle reference numeral 190 is displayed at the −90° pitch angle and allows the pilot to maintain his bearings relative to the imaginary sphere in which he is flying.

While an examplary embodiment of this invention has been described above and shown in the accompanying drawings, it is to be understood that such embodiment is merely illustrative of and not restrictive on the broad invention. This invention is not to be limited to the specific apparatus or arrangement described and shown and is intended to include all equivalents thereof and modifications which may occur to persons having ordinary skill in the art.

What is claimed is:

1. A graphics display system for displaying aircraft flight information comprising:
   a. a screen for displaying graphic data,
   b. an optical system for transmitting an image of said screen display to a position within a field of view of a pilot of the aircraft,
   c. means for sensing a pitch angle of said aircraft and generating a signal indicative of said pitch angle,
   d. means for selecting a pitch ladder bar display sequence based on said pitch angle signal,
   e. means for generating said pitch ladder bar display sequence such that each pitch ladder bar possesses a generally different radius of curvature, and
   f. means for displaying said generated pitch ladder bar display sequence on said screen.

2. A display system as described in claim 1 further comprising:
   a. means for sensing aircraft heading and generating a signal indicative of aircraft heading, and
   b. means for displaying aircraft heading data on said screen superimposed on some of said displayed pitch ladder bars, said data based on said heading signal.

3. A display system as described in claim 2 wherein the radius of curvature of said pitch ladder bars decreases as the absolute value of pitch angle increases.

4. A display system as described in claim 3 wherein the radius of curvature of the 0° pitch ladder bar is infinite and the pitch ladder bar displayed for plus or minus 90° pitch is a closed figure.

5. A display system as described in claim 4 further comprising:
   a. means for sensing aircraft roll and generating a signal indicative of the magnitude of roll,
   b. means for generating a curved scale having roll angle indicia disposed thereon,
   c. means for generating a bank symbol on the scale indicating the angle of bank, said position of said symbol based on said roll signal, and
   d. means for displaying said scale and said symbol on said screen.

6. A display system as described in claim 5 further comprising:
   a. means for inhibiting display of said symbol for roll angles greater than 30°.

7. A display system as described in claim 6 further comprising:
   a. means for rotating the pitch ladder bar display through an angle equivalent to roll angle responsive to said roll signal.

8. A display system as described in claim 7 further comprising:
   a. means for sensing aircraft speed and direction, and generating signals indicative thereof,
   b. means for displaying the magnitude of said speed, and
   c. means for displaying the direction of said aircraft relative to heading and pitch displays.

9. A display system as described in claim 8 further comprising:
   a. means for displaying numerical data as indicia of altitude based on aircraft altitude sensor.

10. A display system as described in claim 9 further comprising:
    a. means for labeling heading indicia on said pitch ladder bars at pre-determined intervals, and
    b. means for selecting said intervals based on said pitch angle signal.

11. A display system as described in claim 10 wherein said selecting means selects heading intervals proportional to pitch angle.

12. A display system as described in claim 11 wherein said intervals are selected as follows:
    a. for pitch angles greater than ⊥75°⊥ said selection means selects an interval of 30°,
    b. for pitch angles greater than ⊥70°⊥ but less than or equal to ⊥75°⊥ said selection means selects an interval of 15°,
    c. for pitch angles greater than ⊥30°⊥ but less than or equal to ⊥70°⊥ said selection means selects an interval of 10°, and
    d. for pitch angles of ⊥30°⊥ or less said selection means selects an interval of 5°.

13. A display system as described in claim 11 wherein said means for selecting a pitch ladder bar display sequence is a portion of a computer program comprising:
    a. means for comparing the screen field of view angle with the pitch angle,
    b. means for incrementally reducing the pitch angle until the angle of pitch is within the screen field of view, and
    c. means for storing the original value of the pitch angle.

14. A display system as described in claim 13 wherein said means for generating said pitch ladder bar sequence is a portion of a computer program comprising:
    a. means for generating a plurality of intersection points of heading and pitch on the inner surface of a reference sphere as though the aircraft was positioned at the center of said sphere, and
    b. means for converting such intersection points to display points for display on said screen.

15. A display system as described in claim 14 further comprising:
    a. means for interconnecting said points.

16. A graphics display system for displaying aircraft attitude information comprising:

a. screen for displaying graphic data,
b. an optical system for coupling an image of said displayed graphic data to a position within a field of view of a pilot of the aircraft,
c. means for detecting a pitch angle of said aircraft and generating a signal proportional thereto,
d. means for selecting a plurality of pitch ladder bars for display based on said pitch angle signal,
e. means for generating said pitch ladder bar display, each of said pitch ladders comprising a plurality of coordinate points interconnected by straight line segments, said segments having different slopes for different pitch angles, and
f. a means for displaying said generated pitch ladder bar display on said screen.

17. A display system as described in claim 16 further comprising:
    a. means for detecting aircraft heading information and generating a signal proportional thereto, and
    b. means for displaying aircraft heading information as graphic data on said screen superimposed on some of said displayed pitch ladder bars, said graphic heading data based on said heading signal.

18. A display system as described in claim 17 wherein the radius of curvature of said pitch ladder bars decreases as the absolute value of pitch angle increases.

19. A display system as described in claim 17 wherein the zero degree pitch bar line segments have zero slope, and the pitch bar displayed for plus or minus 90° is a closed figure.

20. A display system as described in claim 19 further comprising:
    a. means for sensing aircraft roll and generating a signal indicative of the magnitude of roll,
    b. means for generating a curved scale having roll angle indicia disposed thereon,
    c. means for generating a bank symbol on the scale indicating the angle of bank, said position of said symbol based on said roll signal, and
    d. means for displaying said scale and said symbol on said screen.

21. A display system as described in claim 20 further comprising:
    a. means for selectively inhibiting the display of said symbol based on said roll signal.

22. A display system as described in claim 21 further comprising:
    a. means for rotating the pitch bar display through an angle equivalent to roll angle responsive to said roll signal.

23. A display system for viewing aircraft flight information comprising:
    a. means for sensing pitch and roll angles of an aircraft;
    b. means for generating a reference spherical surface with an origin at the position of the aircraft, said surface having a vertical polar axis and latitudinal reference markings corresponding to different pitch angles from −90° to 90°;
    c. means for calculating, from said pitch and roll angles, an intersection of a projected flight path of the aircraft with the surface based on said angles; and
    d. means for displaying to an operator of said aircraft an effective segment of such surface surrounding the intersection from the perspective of the aircraft at the origin.

24. The display system of claim 23 further comprising:
    a. means for sensing the heading angle of an aircraft;
    b. means whereby the spherical surface is referenced to north;
    c. means for calculating the intersection of the projected flight path of the aircraft with the surface based on the heading angle of the aircraft; and
    d. means for displaying the effective segment of such surface surrounding the intersection wherein the displayed segment indicates the heading angle of the aircraft.

25. The system of claim 23 wherein the displayed segment indicates the pitch angle of the aircraft in relation to a pitch ladder bar, wherein the pitch ladder bars comprise those portions of the latitudinal reference markings within the displayed segment of the spherical surface.

26. The system of claim 25 wherein a plurality of absolute heading angles are indicated along the pitch ladder bars.

27. The system of claim 23 wherein the horizontal axis of the display means is essentially parallel to the lateral axis of the aircraft as projected onto the displayed segment.

28. The system of claim 23 wherein the display means comprise:
    a. a screen for displaying the segment of the spherical surface,
    b. optical system for transmitting an image of the screen display to a position within a field of view of a pilot of the aircraft.

* * * * *